United States Patent [19]
Hilgendorf et al.

[11] Patent Number: 5,974,543
[45] Date of Patent: Oct. 26, 1999

[54] APPARATUS AND METHOD FOR PERFORMING SUBROUTINE CALL AND RETURN OPERATIONS

[75] Inventors: Rolf Hilgendorf, Boeblingen; Oliver Laub, Leinfelden; Hans-Werner Tast, Weil i.Sch., all of Germany

[73] Assignee: International Business Machines Corporation, Armonk, N.Y.

[21] Appl. No.: 09/024,691

[22] Filed: Feb. 17, 1998

[30] Foreign Application Priority Data

Jan. 23, 1998 [DE] Germany .............................. 98101147

[51] Int. Cl.⁶ ...................................................... G06F 9/32
[52] U.S. Cl. .............................................................. 712/240
[58] Field of Search .............................................. 712/240

[56] References Cited

U.S. PATENT DOCUMENTS

| | | |
|---|---|---|
| 4,399,507 | 8/1983 | Cosgrove et al. . |
| 4,725,947 | 2/1988 | Shonai et al. . |
| 5,093,778 | 3/1992 | Favor et al. . |
| 5,136,696 | 8/1992 | Beckwith et al. . |
| 5,230,068 | 7/1993 | Van Dyke et al. . |
| 5,276,882 | 1/1994 | Emma et al. ............................. 395/700 |
| 5,623,614 | 4/1997 | Van Dyke et al. ...................... 712/240 |
| 5,768,576 | 6/1998 | Hoyt et al. ............................... 712/238 |
| 5,850,543 | 12/1998 | Shiell et al. .............................. 712/238 |
| 5,881,278 | 3/1999 | Tran et al. ............................... 712/242 |

OTHER PUBLICATIONS

IBM Technical Disclosure Bulletin—vol. 30, No. 11, Apr. 1988, "Subroutine Call/Return Stack" by C. F. Webb, pp. 221–225.

Yeh et al., "A Comprehensive Instruction Fetch Mechanism for a Processor Supporting Speculative Execution," *Proceedings of the 25th Annual International Symposium on Microarchitecture, MICRO 25*, IEEE, pp. 129–139, Dec. 1–4, 1992.

*Primary Examiner*—William M. Treat
*Attorney, Agent, or Firm*—Marc A. Ehrlich

[57] ABSTRACT

An apparatus and a method for performing subroutine call and return operations in a computer having a processor with an instruction prefetch mechanism which includes a branch history table for storing target addresses of a plurality of branch instructions found in an instruction stream. The branch history table 22 contains a potential call instruction tag 37 and a return instruction tag 39. For each potential subroutine call instruction found in a prefetch instruction stream an address pair containing the call target address and the next sequential instruction address of the instruction is stored in a return identification stack 24. Subsequently detected branch instructions initiate an associative search on the next sequential instruction part in the return identification stack where a matching entry identifies the branch instruction as a return instruction. The address pair contained in the matching entry is then transferred to a return cache 30 which is arranged in parallel to the branch history table. The branch history table and the return cache are simultaneously accessed in the same operation cycle with the address 28 of each prefetched instruction, and if by the access a return instruction tag is found, the next sequential instruction address from the return cache is used as return address. A return cache update 32 is performed in response to a branch instruction in the instruction stream by a lookup of the return cache for an entry having a corresponding target address and by replacing the next sequential instruction address in said entry by the next sequential address of said branch instruction.

29 Claims, 5 Drawing Sheets

NEXT PREFETCH ADDRESS

APPARATUS AND METHOD FOR PERFORMING SUBROUTINE CALL AND RETURN OPERATIONS

FIELD OF THE INVENTION

The invention relates to an apparatus and a method for performing subroutine call and return operations in a computer having a processor with an instruction prefetch mechanism which includes a branch history table for storing target addresses of a plurality of branch instructions detected in an instruction stream.

BACKGROUND OF THE INVENTION

Programmers quite often use subroutines to structure their programs and to avoid writing repeated tasks several times. A subroutine is invoked from the main program by a call instruction and ends with a return instruction which brings the control back to the instruction in the main program immediately following the call instruction. Since the same subroutine is often called from several locations in the program, the return instruction will have several locations to which it has to return dependent on where the subroutine was called from. A return instruction is basically a branch instruction which in this case has several targets. If the branch is to be predicted, it is not the taken or not taken prediction which is relevant but the determination of the correct target address for time critical use at execution time. In an instruction set architecture with dedicated call and return instructions, a return stack is used to predict the target address of the return instruction. In other instruction set architectures which do not use dedicated call and return instructions additional hardware is needed to predict the return target address.

Webb, "Subroutine Call/Return Stack", IBM Technical Disclosure Bulletin, Vol. 30, No. 11, Apr. 1988, pages 221–225, discloses the arrangement of two stacks one of them used for the target address of a call instruction and the other for the next sequential instruction of the same call instruction. Whenever a branch is found in the instruction stream which is a potential call, its target address and next sequential address are written onto the stacks. If a potential return instruction is encountered in the instruction stream, its target address is compared to all addresses stored in the next sequential stack and if one entry having an equal address was found, the potential return address becomes an identified return by writing a return mark bit into the related entry of the branch history table (BHT). In addition, the target address of the initiating call is also stored in this entry of the BHT. The next time if a BHT lookup is made for obtaining the return address, the target address is not directly taken from the BHT but rather the address from the BHT is used to search the call/return stack target part. If a match is found, the entry from the corresponding next sequential instruction stack is taken as the target address of the return. The operation requires at least two cycles to define the target address of a return, where one of the cycles includes an associative search in the stack.

Furthermore, U.S. Pat. No. 5,276,882 (Emma et al) discloses a subroutine return through a branch history table which includes two additional fields consisting of a call field to indicate that the branch entry corresponds to a branch that may implement a subroutine call, and a pseudo field which represents linkage information and creates a link between a subroutine entry and a subroutine return. If the target address of a potential return is sent to the BHT and a call instruction is found immediately preceding this address, a pseudo call/return pair is established by storing a pseudo entry at the target address of the call instruction which is the subroutine start. The pseudo entry contains the address of the return instruction as its target address. If the subroutine is called, the BHT entry is looked up and the pseudo entry is found. Detecting such an entry invokes an update process which changes the target address of the return instruction to the next sequential address of the call. Now when at execution time a BHT lookup for the return is performed the correct target is found.

The location of the pseudo entry at the start address of the subroutine limits this subroutine return approach to single exit subroutines. The pseudo entry also requires additional space in the BHT. Furthermore, the block structure of the BHT is such that it will not always be possible to find the preceding call instruction.

SUMMARY OF THE INVENTION

The invention as defined in the claims relates to an apparatus and a method for performing subroutine call and return operations in a computer having a processor with an instruction prefetch mechanism which includes a branch history table for storing target addresses of a plurality of branch instructions detected in an instruction stream. It is an object of the invention to reduce the processing time to define the target address of a subroutine return instruction.

According to the invention the branch history table contains branch type information for each branch instruction including a potential call instruction tag and a return instruction tag. For each potential subroutine call instruction detected in the prefetch instruction stream an address pair containing the call target address and the next sequential instruction address of the identified instruction is stored in a stack of a return identification unit. In response to each potential return instruction subsequently detected in the prefetch instruction stream an associative search is performed on the next sequential instruction part in the stack where a match identifies the instruction as a return. The address pair contained in the matching entry is transferred to a return cache which is arranged in parallel to the branch history table.

The branch history table and the return cache are simultaneously accessed with the address of each prefetched instruction for identifying the instruction as a branch and for additionally identifying the instruction as a return by using the branch type information stored in the branch history table. If the instruction is a return, the next sequential instruction address from the return cache is taken as return address instead of the target address from the branch history table.

A return cache update is performed in response to a branch instruction in the instruction stream by a lookup of the return cache for an entry having a corresponding target address and by replacing the next sequential instruction address in said entry by the next sequential of said branch instruction.

The invention allows an access to the correct target address of an identified subroutine return instruction in only one operation cycle. The apparatus and method according to the invention are capable to process multiple returns of one subroutine without expanding the operation time beyond one BHT lookup per return instruction. Furthermore, the invention avoids expanding the entry width of the branch history table by additional address fields to identify call/return pairs.

BRIEF DESCRIPTION OF THE DRAWINGS

A preferred embodiment of the invention is subsequently described with reference to accompanying drawings which show.

DETAILED DESCRIPTION OF A PREFERRED EMBODIMENT OF THE INVENTION

Figure 1:
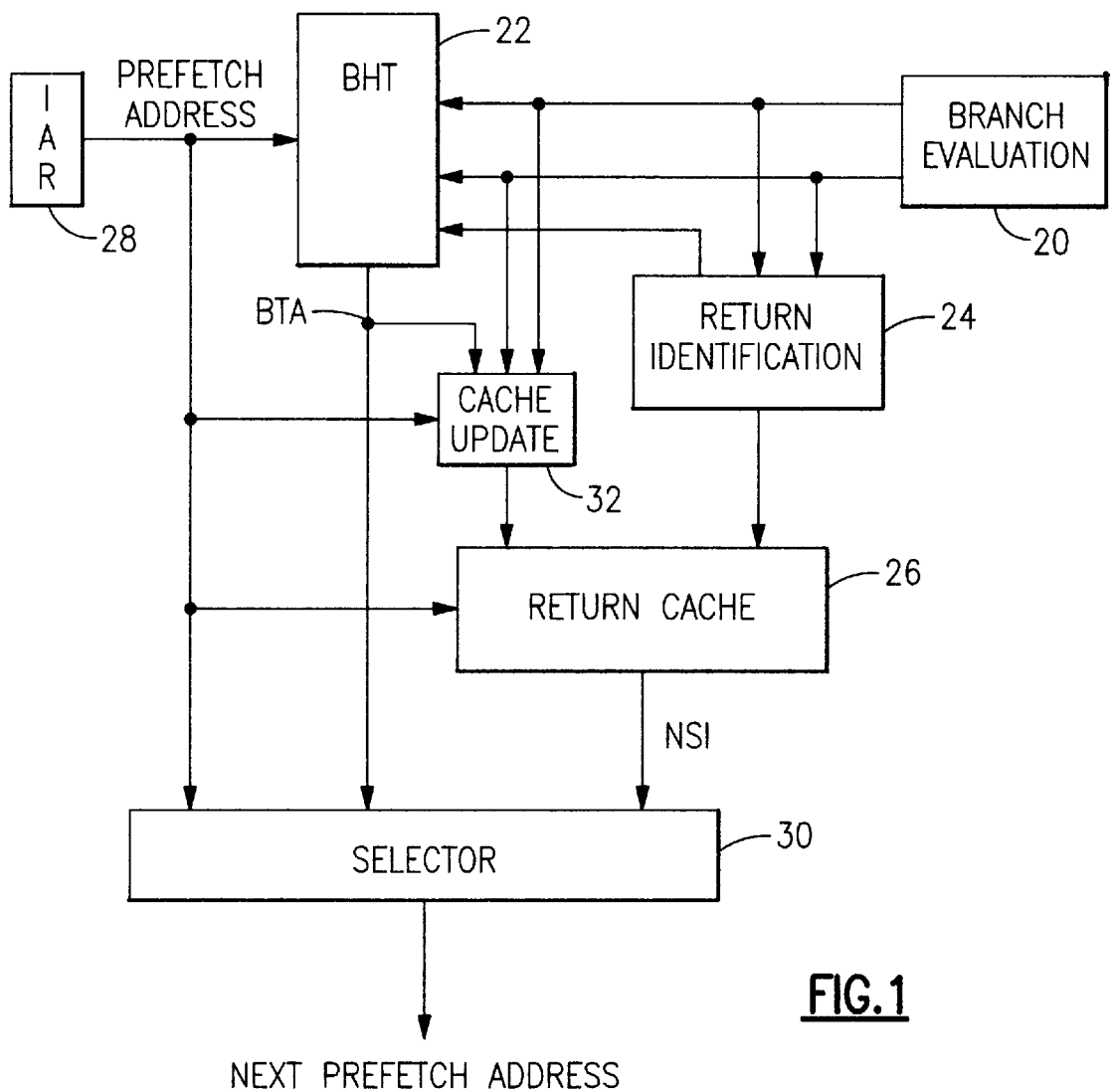
FIG. 1 is a general block diagram of an embodiment of the invention.

The apparatus shown in FIG. 1 is part of a computer including a processor which comprises an instruction execution unit and a storage system consisting of a hierarchy of storages including main storage and a cache. The processor is equipped with an instruction prefetch mechanism which performs instruction access operations in the cache or in the main storage and generates a prefetch instruction stream. The instruction execution unit is arranged according to the pipeline concept for simultaneously processing a plurality of instructions. A computer architecture using a prefetch mechanism and a pipelined instruction execution unit is well known and is thus not shown herein.

The instruction sequences processed by such processor may contain various types of conditional and unconditional branch instructions also performing subroutine calls and subroutine returns. Such type of branch instructions are not explicitly dedicated to subroutine calls and returns but have to be identified as such by their appearance and function within the instruction sequence. Examples of branches performing subroutine calls are BAL (Branch and Link) and BALR (Branch and Link Register).

The apparatus shown in FIG. 1 identifies subroutine call and return instructions in the prefetch instruction stream and performs the required address processing of the identified subroutine call and return instructions in the prefetch phase to provide a fast accessibility of variable subroutine return addresses.

Figure 2:
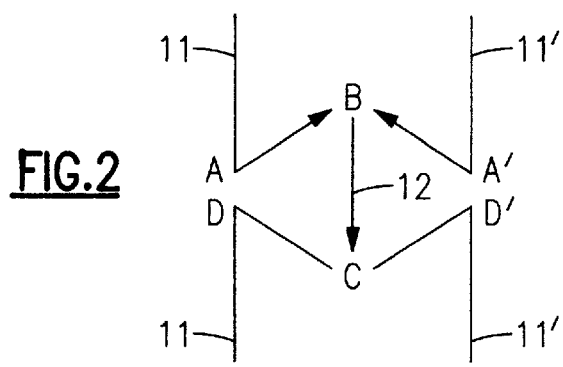
FIG. 2 is a schematic representation of an instruction sequence with repeated use of a subroutine.

FIG. 2 shows a typical program structure including instruction sequences 11, 11' and a subroutine 12 which is used several times during the execution of a program at the same or at different places of the program. Subroutine 12 has a start instruction B and a return instruction C. Instruction A of sequence 11 is a branch and link type of instruction performing a call to the start instruction B. Instruction C is a normal branch instruction and performs a return back to the next instruction in the sequence 11 which is instruction D. Similarly, instruction A' of a second instruction sequence 11' is also a branch and link type of instruction performing a call to the start instruction B. In this case the return address of instruction C is different from the return address of C used before since the instruction C has to perform a return back to the instruction D' of the sequence 11'. Thus, the address of C must be modified when there is a call from the second instruction sequence 11'.

Figure 3:
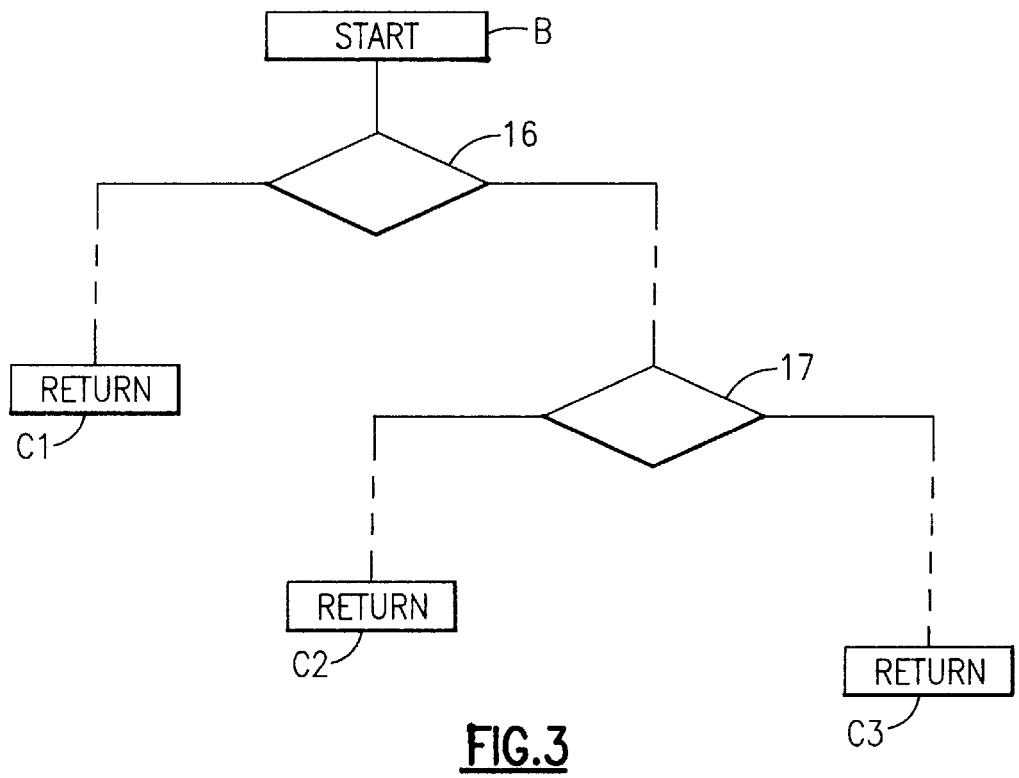
FIG. 3 is a schematic representation of a subroutine having multiple exits as processed according to the invention.
Figure 4:
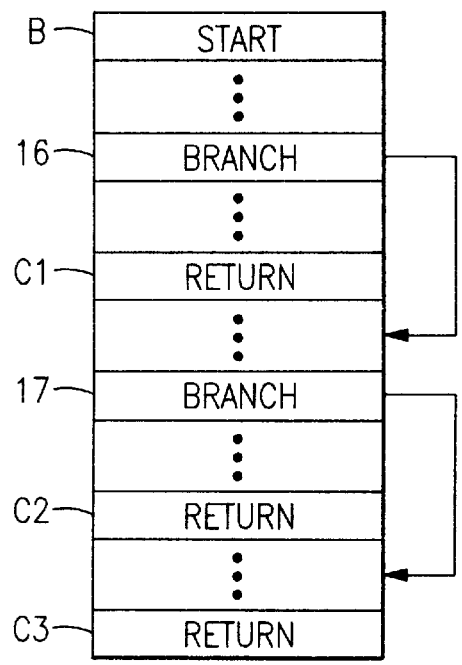
FIG. 4 is the layout of a storage including a subroutine of the type represented in FIG. 3.

FIG. 3 shows an example of the subroutine 12 which contains more than one return instructions which further complicates the return address handling. Branch instructions 16, 17 select different portions of the subroutine 12 each portion having its own return instruction C1, C2 or C3 which bring the control back to the next instruction of the sequence from where the start instruction B was called. Thus, return address modifications must be performed for each of the different return instructions C1, C2, C3. FIG. 4 shows a storage layout of the subroutine according to FIG. 3 having multiple returns.

Referring back to FIG. 1, the apparatus shown therein performs the return address handling according to FIGS. 2–4 in a manner that only one machine cycle is required to obtain the correct return address. A branch evaluation unit 20 which is part of the execution unit (not shown) determines whether a branch was taken and investigates the branch parameters. The branch evaluation unit 20 is connected to a branch history table 22, herein also designated as BHT, which contains information on branch instructions most recently executed over a certain period of time. The BHT is addressed by the branch evaluation 20 unit and receives from the branch evaluation 20 branch type information. The same information is submitted to a return identification unit 24 which stores for each potential call instruction the call target address (CTA) and the next sequential instruction address (NSI). The CTA-NSI address pair of the potential call is used to identify a subsequent branch instruction as a subroutine return. The return identification unit 24 generates a return identification signal which is stored as a return tag in the related entry of the BHT. Simultaneously, the identified CTA-NSI address pair is transferred to a return cache 26 which is arranged in parallel to the BHT with regard to a prefetch instruction register 28. When an instruction prefetch operation takes place, a selector 30 determines the next prefetch address which may be a branch target address from the BHT or the NSI address from the branch return cache 26. The latter address is selected if in the BHT the entry addressed by the instruction address register 28 indicates a return tag, otherwise the branch target address from the BHT is selected. If for the same address there is neither an entry in the BHT nor in the return cache 26, the contents of the instruction address register 28 is incremented by the instruction length and then used as the next prefetch address. A return cache update operation for the NSI entries of the return cache 26 is performed by an update circuitry 32. This operation updates a next sequential address NSI of a return instruction already contained in the return cache 22. Whenever a potential call is found in the instruction stream, its call target and its next sequential address are forwarded to the return cache 26 to modify the related entries therein. A redirection of a return entry in the cache 26 to the valid NSI is performed if the same subroutine is called by different call instructions such as instruction A' of FIG. 2.

Subsequently, the embodiment according to FIG. 1 is described in more detail with reference to FIGS. 5 and 6. The entries of the branch history table 22 have a format as indicated in FIG. 6. Each entry is assigned to a branch instruction indicated by the branch evaluation unit 20 and comprises a valid flag 33, an address tag 34, a branch target address field 35 and a branch history information field 36. Each entry of the BHT comprises three additional fields which are a potential call tag field 37, an instruction length field 38 and a return tag field 39. The branch history table 22 is blockwise organized where each block is accessed by an external address while addressing within an block is performed by internal addressing with a part of the instruction address from the instruction address register 28. This address part is applied to the address tag field 34 which is used as an associative address field. The field 35 receives the target address of a branch instruction. For this purpose branch evaluation unit 20 addresses via latches 41 and lines 42 the branch history table with the instruction address of a branch instruction processed by the unit 20. The target address of this branch instruction is loaded via latches 43 and lines 44 to the filed 35 of the addressed entry and its valid flag V is set from zero to one. The branch history information in field 36 is updated on each occurrence of a branch but not shown herein. Furthermore, branch type information is loaded via latches 45 and lines 46 into the fields 37 and 39 of the addressed entry.

During the load operation of the branch history table 22 three types of branches are distinguished: possible call instructions as depending on the branch type information, identified return instructions, and normal branches. If the BHT is loaded with a new entry, the entry has to be assigned to one of the three branch types. If the loading instruction is a potential call, the potential call tag field 37 of the corresponding entry is set to "one" and the length of the instruction, which may be 2, 4 or 6 bytes, is written into field 38 of that entry. When the identification unit 24 has determined that the loading instruction is a return instruction, the return tag field 39 of the corresponding entry is set to "one" and the potential call tag field 37 of that corresponding entry is set to "zero". If the loading instruction is neither a potential call nor a return, both fields 37 and 39 are set to "zero" indicating a normal branch.

The branch evaluation unit 20 supplies the instruction address and the call target address also to a return identification stack 50 which is part of the return identification unit 24 of FIG. 1. Each entry of the return identification stack 50 comprises a pair of fields 51, 52 of which field 51 contains a next instruction address NSI and field 52 contains a related call target address. The return identification stack 50 is operated as a circular queue of registers. If it is full, the newest entry overwrites the oldest one. In addition, the entries of the return identification stack 50 are accessible by associative addressing the NSI fields 51 with a branch target address from the unit 20. For every potential call instruction found in the instruction stream and processed by unit 20 an entry into the return identification stack 50 is generated by a load control signal on line 55 generated by a decoder 54 which receives through lines 56 branch type information from the unit 20. This entry is loaded with the NSI address and the target address of the potential call instruction. The NSI address is derived from the branch instruction address by incrementing it by the instruction length. The incrementing is performed by an adder 58 which receives as a first operand the instruction address from unit 20 and as a second operand a value which represents the length of the instruction in terms of bytes. The adder 58 is operated by an add control signal on lines 59 from the decoder 54. The call target address, as provided by unit 20, is loaded via lines 60 into the field 52 of the generated entry in the return identification stack 50.

For each potential return instruction newly detected in the instruction stream an associative search is performed on the NSI part of the return identification stack 50. The search is initiated by a search control signal generated by the decoder 54 on line 62. The search is started from the most recent entry toward the older entries and compares the target address of the potential return instruction with all NSI addresses stored in stack 50. If no match is found, the branch instruction is classified as being not a return and the target instruction of the branch instruction is entered into BHT without setting the return tag in field 39. If a match occurs, the instruction to be entered into the BHT is marked as a return. A match indication signal generated by the matching entry in stack 50 is sent through latch 64 and line 65 as part of the branch type information to the BHT to set the return tag field 39 to "one" and the field 37 to "zero" while the target address of the instruction identified as a return is entered into field 35 of the addressed entry in the BHT.

Furthermore, the match indication signal is applied by line 66 as load control signal to the return cache 26 to initiate the transfer of the address pair contained in the matching entry of the stack 50 through lines 67, 68 into the return cache. The return cache 26 is a set of associative buffers with each entry comprising valid flag field 71, a tag field 72 used for associative addressing, a call target address field 74 and a next sequential address field 73. The address pair from stack 50 is stored in the fields 73 and 74 of an entry which is addressed by the address of the identified return instruction on lines 69. A part of this address is loaded in the tag field 72 of the addressed entry for being used for associative addressing when the return cache 26 is accessed.

In case that a subroutine contains more than one return, as shown in FIGS. 3 and 4, the steps of identifying a branch instruction as a return instruction and of transferring the corresponding address pair NSI/Call-Target to the return cache 26 are repeated for every return instruction contained in the subroutine. Thus, the return cache my contain more than one entry containing the same NSI/Call-Target address pair.

For each instruction fetched from the main memory and/or cache, the branch history table 22 is examined to determine whether this instruction is a branch and if so, to determine the target address and what is the contents of its return tag. The BHT lookup operation is performed with the instruction address contained in the register 28 (FIG. 1) which is applied via lines 76 in parallel to the BHT and to the return cache. The addressing of the BHT takes place in a mixed addressing mode. A part of the address from register 28 is used for addressing a block of the BHT while another part is used as an associative address applied to the tag fields 34 of the addressed block. In this manner a one cycle access of the BHT is performed and thereby also the other fields of a matching entry are accessed including the return tag field 39. Simultaneously with the BHT lookup and within the same machine cycle, the return cache 26 is accessed by using a part of the same instruction address from register 28 as an associative address applied to the tag fields 72 of all entries of a block of storage locations in the return cache 26 which block is addressed by another part of the same address from register 28. If the BHT lookup results in a matching entry and that entry has an return tag set to "one", and if simultaneously the return cache 26 shows a matching entry, the next sequential address NSI is selected from the field 73 of the matching entry in the return cache 26 to be used as the next prefetch address. The address selection is performed by the selector 30 (FIG. 1) which comprises multiplexers 78, 79, an adder 80 and an AND-circuit 81. Multiplexer 78 receives on first input lines 84 the branch target address from the matching entry of the BHT and on second input lines 87 the next sequential address from the matching entry of the return cache 26. If a control signal from the AND-circuit 81 is "zero", the first input of the multiplexer 78 is switched through to multiplexer 79. The AND-circuit 81 receives from the BHT via line 85 the return tag "one" of the matching BHT entry and from the return cache 26 via line 86 the valid flag V of the matching entry, and it generates a control signal "one" which conditions the multiplexer 78 to transfer the next instruction address from the matching entry of the return cache 26 to the multiplexer 79 instead of the branch target address form the BHT. The multiplexer 79, if conditioned by a "one" control signal on line 88 from the valid flag field 33 of the matching entry in the BHT, transfers the input from the multiplexer 78 to output lines 89 for being used as the next prefetch address. The adder 80 is inherently controlled to increment the instruction address on line 76 by an instruction length value. If there is no matching entry found in the BHT as indicated by a "zero" signal on line 88, the multiplexer 79 is conditioned to transfer the output of the adder 80 to the output lines 89 for being used as the next prefetch address.

The next sequential address of an entry in the return cache 26 has to be updated when the related subroutine is called again. This update is performed by a return cache update procedure implemented in the circuitry 32 (FIG. 1) which comprises multiplexers 91 and 92, a decoder 93 and an adder 94. The multiplexer 91, 92 are controlled by the decoder 93 according to the type of operation of the branch history table 22. If the BHT is accessed by the prefetch address on line 76 and a matching entry is found indicating in its field 37 a potential call, this field is read to generate via latch 96 and line 97 an input signal to the decoder 93 which responds by sending a control signal on lines 95 to multiplexers 91, 92 and the adder 94. By this control signal the multiplexer 91 is conditioned to transfer the call target address from field 35 of the matching entry via latches 98 and lines 99 to the search input 100 of the return cache 22. Using the associative search mechanism of the return cache 26, the call target address fields 74 of each entry in the return cache 26 are compared to the call target address of the potential call instruction in the BHT. If a match is found, the prefetch instruction address on line 76 is transferred via latch 101, line 102 and multiplexer 92 to the adder 94 which increments this address by the instruction length as indicated by the length field 38 of the matching entry in the BHT. The instruction length information is transferred via lines 85 and 97 to the decoder 93 which controls the adder 94 accordingly. The output of the adder 94 represents the next sequential instruction address which is entered into the NSI field 73 of the matching entry in the return cache 26 replacing the NSI address stored therein before. This NSI address replacement is repeated for each potential call found in the BHT.

A similar address update procedure is performed when a new entry of the branch history table 22 is generated by means of the branch information appearing on lines 42, 44 and 46. In this case, with addressing the BHT by the instruction address on lines 42, the decoder 93 receives from lines 46 the branch type information indicating the branch as a potential call. In response to this input the decoder 93 generates control signal to the multiplexers 91, 92 and the adder 94. By the control signal from decoder 93 the multiplexer 91 is conditioned to transfer the target address of the branch instruction from line 44 to the search input 100 of the return cache 26 to perform a search on the call target fields of each entry of the return cache 26. If a match is found, the instruction address from line 42 is transferred through the multiplexer 92, conditioned by the control signal from decoder 93, to the adder 94. The instruction length is indicated by the branch type information on line 46 and initiates the decoder 93 to generate signals which controls the adder 94 to increment the instruction address from line 42 by the instruction length. Again, the output of the adder 94 represents the next sequential instruction address and is entered into the NSI field 73 of the matching entry in the return cache 26 replacing there the NSI address stored therein before.

During the search operations in the return cache more than one matching entry may be found for one call target address as there may be more than one return of the same subroutine as shown in FIGS. 3 and 4. For each match found by the associative search a corresponding update of the NSI address in the field 73 of the matching entry is performed as described above. Accordingly, each address fetch operation in the BHT and the return cache 26 for a subroutine return address results in the correct target address which is the updated NSI address of the current return instruction to be executed.

Figure 8:
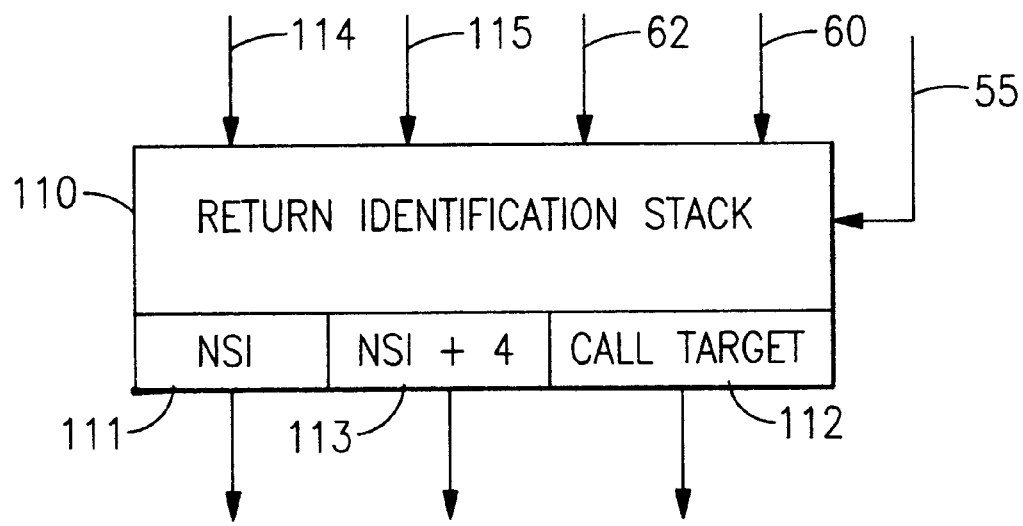
FIG. 8 is a block diagram of a modified return stack as used in the embodiment of FIG. 7.
Figure 9:
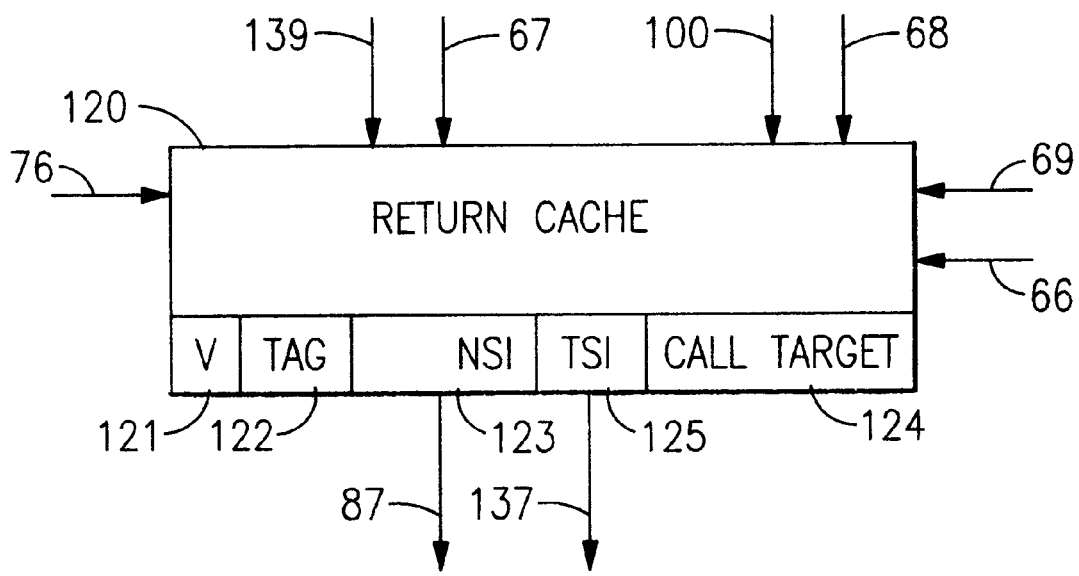
FIG. 9 is a block diagram of a modified return cache as used in the embodiment of FIG. 7.

A modified embodiment of the invention is subsequently described with reference to FIGS. 7–9. The modified embodiment takes account of the programming requirement, to set up the subroutine return target address in certain cases to an address which is 4 bytes beyond the NSI address described above with reference to FIGS. 1–6. Which return address has to be used, is a matter of programming and varies from subroutine to subroutine. The modified embodiment thus provides an address type selection mechanism as part of the return identification unit 24 and of the return address update circuitry 32.

According to the modified embodiment the entries of the return identification stack 50 are extended by an additional field. FIG. 8 shows the modified return identification stack 110 each entry of which includes fields 111, 112 and 113. The fields 111 and 112 correspond to the fields 51 and 52 of FIG. 5 where field 111 contains the next sequential address NSI and field 112 contains the call target address CTA of an identified return instruction. The additional field 113 is used to contain the NSI address incremented by "4". This NSI+4 address is generated by the adder 58 (FIG. 5) under the control of signals on lines 59 from the decoder 54. The components 54 and 58 are for this purpose accordingly modified. The decoder 54 generates said control signals in response to corresponding branch type information from the branch evaluation unit 20 which determine the type of return address to be used. The results of the adder 58 are loaded to the return identification stack 110 through lines 114 and 115 of which the lines 114 are assigned to the NSI address and lines 115 to the NSI+4 field 113.

The search for a return is not only performed on the NSI addresses in the fields 111 of all entries in the in the modified return identification stack 110 as described with reference to FIG. 5 but in addition also on the fields 113 of all entries in the modified return identification stack 110. If a match is found for a NSI+4 address, the return tag field 39 in the BHT is set as described before, and also the matching address pair NSI+4/Call-Target is transferred from the return identification stack 110 to the return cache as described before. A modified return cache 120 is used each entry of which contains fields 121, 122, 123, 124, 125 as shown in FIG. 9. The fields 121, 122, 123 and 124 correspond to the fields 71, 72, 73 and 74 described above with reference to FIG. 5 with the exception that the filed 123 may contain the NSI address or the NSI+4 address as received from the return identification stack 110. In the additional field 125 a flag bit TSI is set to "one" when a NSI+4 address was received from the return identification stack 110.

Figure 5:
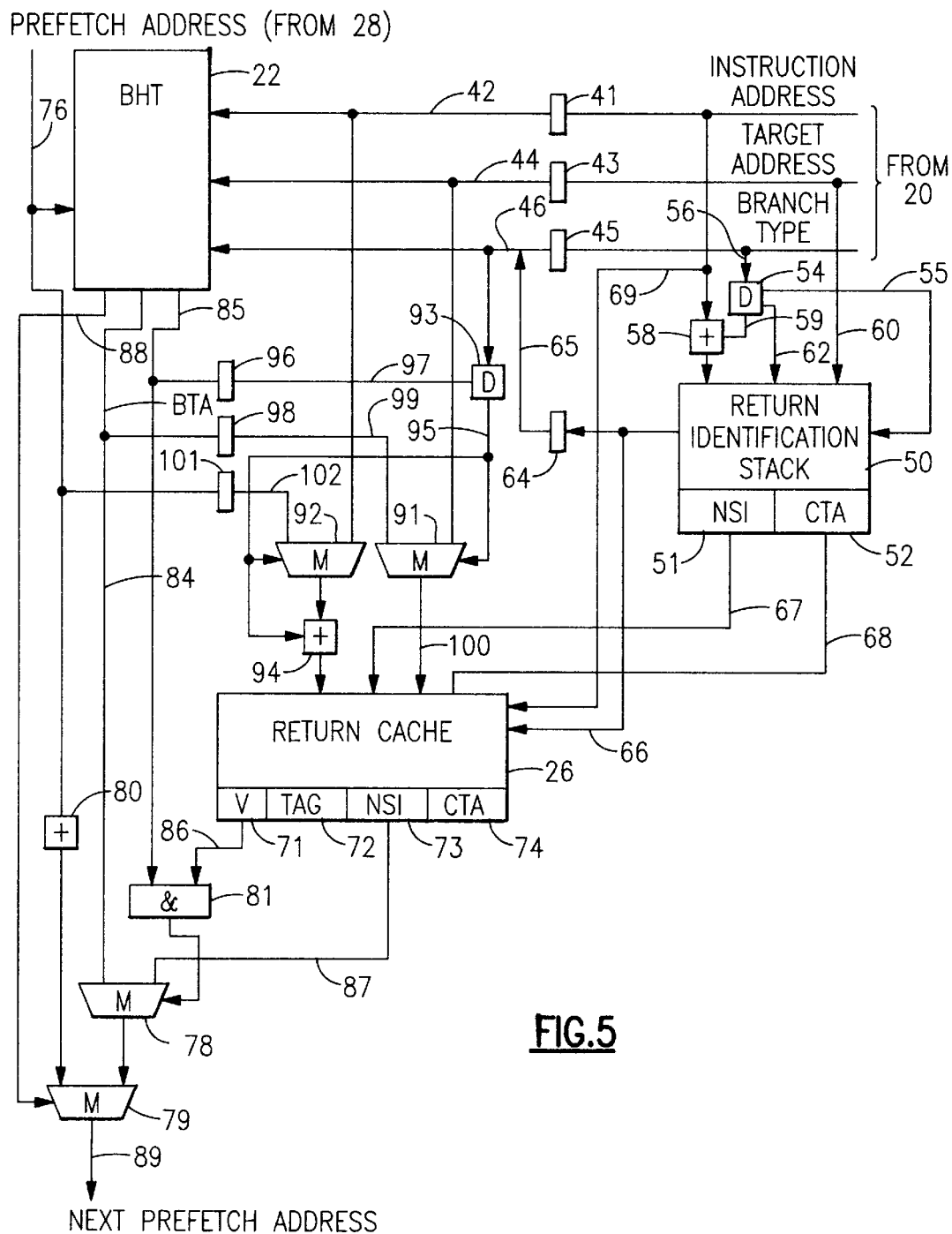
FIG. 5 is a more detailed block diagram of the embodiment of the invention according to FIG. 1.
Figure 6:
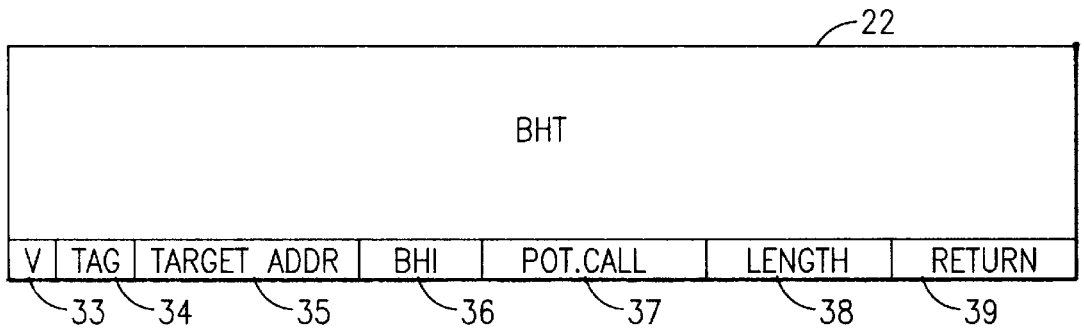
FIG. 6 is a block diagram of a branch history table as used in the embodiment of FIG. 5.
Figure 7:
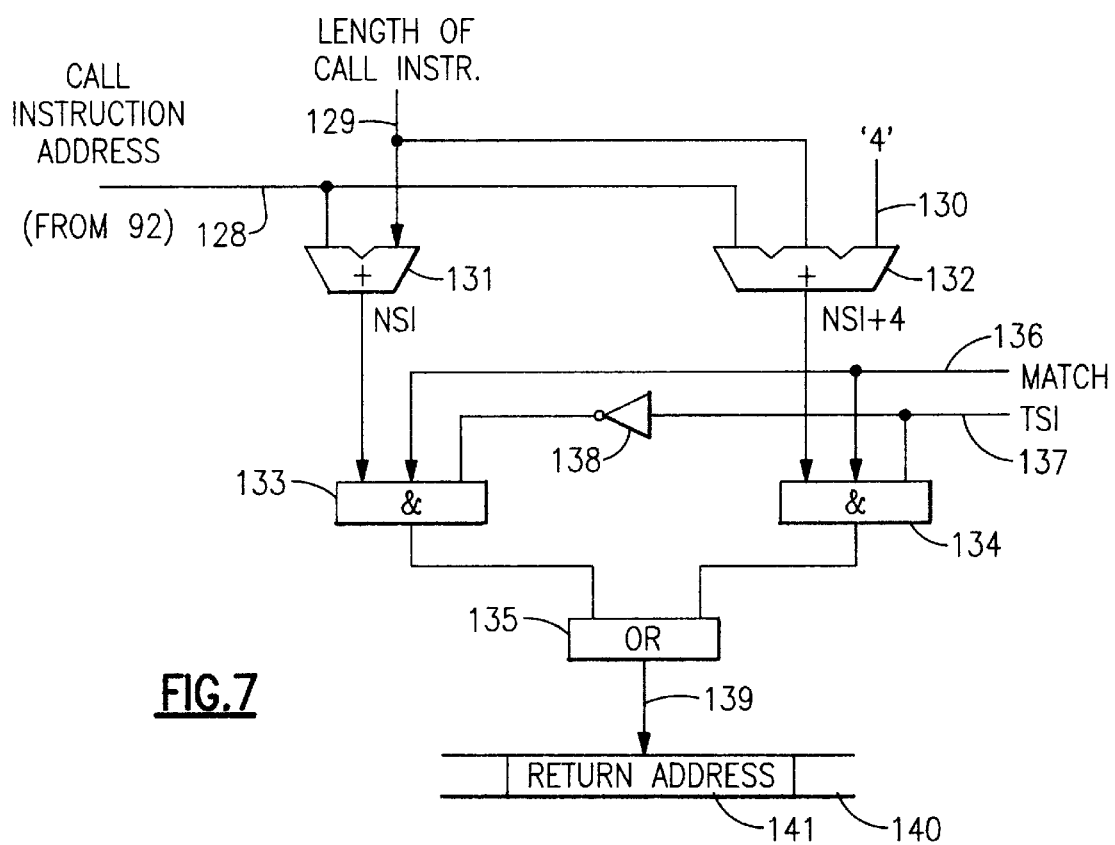
FIG. 7 is the block diagram of an extension of the embodiment of the invention according to FIG. 5.

For the update of a next sequential address in the return cache 120 the circuit according to FIG. 7 is provided which is part of the update circuitry 32 in FIG. 1 and substitutes for the adder 94 in FIG. 5. It comprises adders 131, 132, AND-circuits 133, 134 and an OR-circuit 135. The adder 131 receives at its first input through lines 128 the call instruction address from multiplexer 92 (FIG. 5) and at its second input through lines 129 an instruction length value in terms of bytes. The instruction length is supplied by the branch evaluation unit 20 as part of the branch type information, or from field 38 of the branch entries in the BHT 22 depending whether a BHT load operation or a successful BHT access operation is performed. The adder 131 generates the next sequential address which is transferred through AND-circuit 133, OR-circuit 135 and lines 139 to the return cache 120 if AND-circuit 133 is conditioned by a match signal on line 136 and a "one" output of an inverter 138. The inverter 138 generates a "one" output when in response to a search operation in the return cache 22 the field 125 of the matching entry indicates a TSI flag "zero" on line 137. The output of the OR-circuit 135 is entered into the return address field 141 of the matching entry 140 in the return cache 120 replacing the return address stored therein before.

Also adder 132 receives at its first input through lines 128 the call instruction address from multiplexer 92 (FIG. 5) and at its second input through lines 129 the instruction length value and in addition on a third input 130 the value "4". Simultaneously with the operation of the adder 131 the adder 132 generates an address NSI+4 which is the next sequential address as generated by adder 131 but incremented by 4. The address NSI+4 is transferred through AND-circuit 134 and OR-circuit 135 to the return cache 120 if AND-circuit 134 is conditioned by a match signal on line 136 and a TSI flag "one" is received on line 137 by a search operation in the return cache 22 from the field 125 of the matching entry. Again, the output of the OR-circuit 135 is entered into the the return address field 141 of the matching entry 140 in the return cache 120 as the updated return address to be used when the next subroutine return is identified by the stack 50. The access to the entry 140 and the use of the return address from field 141 is performed in the same manner as described above with reference to FIG. 5.

While the invention is described with reference to preferred embodiments deviations from or modifications of the embodiments shown or other embodiments are within the scope of the invention as defined by the annexed claims.

Having thus described our invention, what we claim as new and desire to secure by Letters Patent is:

1. An apparatus for performing subroutine call and return operations in a computer having a processor which is controlled by sequences of instructions (11, 11') including branch instructions for performing along with other types of branches calls of subroutines and returns to the next sequential address after a subroutine has been executed, each call instruction including a call target address and each return instruction including a return address, and the computer having an instruction prefetch mechanism including means (28) for generating a prefetch instruction stream and including a branch history table (22) for storing target addresses of a plurality of branch instructions found in the prefetch instruction stream, the apparatus comprising:

(a) storage means (37, 39) in said branch history table (22) for storing branch type information for each branch instruction entry, said branch type information including a potential subroutine call instruction tag and a subroutine return instruction tag;

(b) return identification means (24) for storing an entry for each potential call instruction found in the prefetch instruction stream, wherein said entry includes a call target address and a next sequential instruction address of said potential call instruction; and wherein the return identification means including means (54, 62) responsive to a subsequently detected branch instruction for determining whether the subsequently detected branch instruction is a return instruction;

(c) return cache means (26) arranged in parallel to the branch history table means (22), and means (66) responsive to a return instruction identification signal of said return identification means for storing in the branch history table a return tag in the entry of the identified return instruction, and for generating an entry in the return cache to which the call target address and the next sequential instruction address of the identified return instruction are transferred; and (d) access and selector means (28, 30) for simultaneously accessing the branch history table and the return cache with the address of each prefetched instruction for selecting the next prefetch address from the return cache in response to a return tag from the branch history table.

2. The apparatus as recited in claim 1, further comprising return cache update means (32) effective in response to a branch instruction in the instruction stream for performing a lookup operation in the return cache means (26) for an entry having a target address which corresponds to the target address of said branch instruction, and for replacing the next sequential instruction address in the entry found by the next sequential instruction address of said branch instruction.

3. The apparatus as recited in claim 1, wherein each entry of said branch history table (22) includes a first one bit field (37) for storing a potential call tag as provided by a branch evaluation unit (20) during the processing of a potential call instruction, and a second one bit field (39) for storing a return tag as provided by the return identification means (24) after having identified a return instruction, and further includes a third field (38) for storing the instruction length of said potential call instruction.

4. The apparatus as recited in claim 1, wherein said return identification means (24) comprises return identification stack means (50) having a plurality of storage locations each including a first field (51, 111) and a second field (52, 112) for storing address pairs each address pair comprising the next sequential address of a potential call instruction and the call target instruction of the same potential call instruction.

5. The apparatus as recited in claim 4, wherein said plurality of storage locations in said return identification stack means (50) are operated as a circular queue in that the newest entry overwrites the oldest one.

6. The apparatus as recited in claim 4, wherein said plurality of storage locations in the return identification stack means (50) comprise internal addressing capabilities for their first fields (51, 111) to allow an associative search on all next sequential addresses stored in the return identification stack means.

7. The apparatus as recited in claim 1, wherein said return identification means (24) comprises an adder (58) which generates for each potential call instruction the next sequential address by incrementing the instruction address of the potential call instruction by an instruction length value.

8. The apparatus as recited in claim 4, wherein each of said plurality of storage locations of the return identification stack means (110) including a third field (113) for additionally storing the next sequential address of a potential call instruction after being incremented by a predetermined value; and wherein said internal addressing capabilities of the stack means extend to said third fields (113) to allow an associative search on all such incremented next sequential addresses stored in the return identification stack means (110).

9. The apparatus as recited in claim 1, wherein said branch history table means (22) and said return cache means (26)

are arranged to be accessed in parallel in the same machine cycle by applying the same instruction addressing (76) and by providing outputs (84 and 87) in parallel to said selector means (30).

10. The apparatus as recited in claim 2, wherein said return cache means (26) comprises a plurality of storage locations each including a first field (73) and a second field (74) for storing an address pair containing a next sequential address and a call target address as received from the return identification means (24).

11. The apparatus as recited in claim 10, wherein said plurality of storage locations in the return cache means (26) comprise internal addressing capabilities of the second fields (74) to allow an associative search on all call target addresses stored in the return cache means to locate a matching call target address and its related next sequential address for an address update operation of the cache update means (32).

12. The apparatus as recited in claim 10, wherein said plurality of storage locations in the return cache means (26) are subdivided in blocks where each block is addressed by a part of a prefetch instruction address and where each of the storage locations further comprises a tag field (72) which serves as an internal addressing field by storing a part of a return instruction address, and by using another part of the prefetch instruction address as an associative address applied to said tag field to read the next sequential address of a return instruction from the matching entry of the return cache means.

13. The apparatus as recited in claim 10, wherein each of said plurality of storage locations in the return cache means (26) further comprises a valid flag field (71) used to indicate that the storage location contains the next sequential address of a return instruction; and comprising means (81, 78) responsive to said valid flag field of the matching entry for selecting the next sequential instruction address from that entry as the next prefetch address instead of the branch target address from the entry in the branch return table means (22) accessed in parallel to the return cache means.

14. The apparatus as recited in claim 11, wherein said cache update means (32) comprises an adder (94, 131) which generates the next sequential address of a return instruction accessed in or entered into the branch history table (22) by incrementing the instruction address of said return instruction by the instruction length; and further comprises means (91, 93, 100) to perform a search through the call target address fields (74) in the return cache means (26) to locate the next sequence instruction address to be updated.

15. The apparatus as recited in claim 14, wherein said cache update means (32) comprises a second adder (132) which generates the next sequential address of a return instruction accessed in or entered into the branch history table by additionally incrementing the instruction address of said return instruction by a predetermined value, wherein each of said plurality of storage locations in the return cache means (120) further comprises a tag field (125) assigned to the use of said additionally incremented next sequential address, and wherein said cache update means (32) comprises means (133 to 137) responsive to said tag field (125) of the matching entry in the return cache means for selecting said additionally incremented next sequential address for being entered into the return address field (141) of the matching entry in the return cache means (120).

16. A method for performing subroutine call and return operations in a computer having a processor which is controlled by sequences of instructions (11, 11') including branch instructions for performing along with other types of branches, calls of subroutines and returns to the next sequential address after a subroutine has been executed, each call instruction including a call target address and each return instruction including a return address, and the computer having an instruction prefetch mechanism including means for generating a prefetch instruction stream and including a branch history table (22) for storing target addresses of a plurality of branch instructions found in the prefetch instruction stream, the method comprising the steps of:

(a) storing in said branch history table branch type information for each branch instruction entry, said branch type information including a potential call instruction tag and a return instruction tag (37, 39);

(b) detecting a potential call instruction in the prefetch instruction stream and storing an address pair containing the call target address and the next sequential instruction address of the detected call instruction (24, 50);

(c) performing a search on the next sequential instructions of said stored address pairs in response to each potential return instruction subsequently detected in the prefetch instruction stream for identifying the instruction as a return if a corresponding address is found by the search (54, 62, 65, 66);

(d) storing the address pair which contains the matching address into a return cache (26) and storing in the branch history table a return tag (39) in the entry of the identified return instruction; and (e) simultaneously accessing the branch history table and the return cache with the address of each prefetched instruction for determining the instruction as a return, and selecting the next sequential address from said return cache as branch target address rather than the branch target address from the branch history table (28, 30).

17. The method as recited in claim 16, further comprising the step of updating the return cache in response to a branch instruction in the instruction stream by a lookup of the return cache for an entry having a corresponding target address and replacing the next sequential instruction address in said entry by the next sequential address of said branch instruction (32).

18. The method as recited in claim 16, wherein each entry of said branch history table (22) includes a first one bit field (37) for storing a potential call tag as provided by a branch evaluation unit (20) during the processing of a potential call instruction, and a second one bit field (39) for storing a return tag as provided by the return instruction identification step, and further includes a third field (38) for storing the instruction length of said potential call instruction.

19. The method as recited in claim 16, wherein the step (b) further comprises the step of storing said address pairs in a return identification stack (50) and operating the storage locations of which as a circular queue in that the newest entry overwrites the oldest one.

20. The method as recited in claim 19, wherein the step (c) further comprises the step of performing an associative search on all next sequential addresses stored in said return identification stack (50).

21. The method as recited in claim 16, wherein the step (b) further comprises the step of generating for each potential call instruction the next sequential address by incrementing the instruction address of the potential call instruction by an instruction length value.

22. The method as recited in claim 20, further comprising the step of additionally storing in said return identification stack (110) the next sequential address of a potential call instruction after being incremented by a predetermined value; and wherein said step (b) of performing an associative search extends to all incremented next sequential addresses stored in said stack.

23. The method as recited in claim 16, wherein the step (e) further comprises the steps of accessing in parallel and in the same machine cycle said branch history table (22) and said return cache (26) by using the same instruction address (76) and of applying the next sequential address from the selection step in parallel to the outputs of both (84 and 87).

24. The method as recited in claim 23, wherein the step (e) further comprises the step of performing an associative search on all call target addresses stored in the return cache means to locate a matching call target address and its related next sequential address for an address update step.

25. The method as recited in claim 23, wherein the return cache includes one or more storage locations and wherein each of said storage locations in the return cache (26) further comprises a tag field (72) which serves as an internal addressing field by storing a part of the address of the identified return instruction, and wherein step (e) comprises the step of accessing the return cache by using a part of a prefetch instruction address to access a certain block of the return cache and applying another part of the same prefetch instruction address as an associative address to all tag fields (72) within the accessed block, and of fetching the next sequential address of a return instruction from the entry of the matching tag field in the return cache.

26. The method as recited in claim 25, wherein each of said storage locations in the return cache (26) further comprises a valid entry flag (71) indicating that the storage location contains the next sequential address of a return instruction; and wherein said selecting step of step (e) selects in response to a valid entry flag of the matching tag field entry the next sequential instruction address from that entry as the next prefetch address instead of using the branch target address from the branch history table (22).

27. The method as recited in claim 17, wherein said cache update step comprises the steps of generating the next sequential address of a call instruction accessed in or entered into the branch history table by incrementing the instruction address of said call instruction by the instruction length, and of performing a search through the call target addresses stored in the return cache to locate the next sequence instruction address to be updated.

28. The method as recited in claim 27, wherein said cache update step further comprises the steps of generating the next sequential address of a call instruction accessed in or entered into the branch history table (22) by additionally incrementing the instruction address of said call instruction by a predetermined value, and of storing in said storage locations of the return cache (120) a tag (TSI) assigned to the use of said additionally incremented next sequential address, and of selecting in response to a tag (TSI) in the matching entry the additionally incremented next sequential address for being entered into the return address field (141) of the matching entry in the return cache (120).

29. The method as recited in claim 16, wherein the step (c) of performing a search on the next sequential instructions of said stored address pairs is repeated, if a subroutine includes more than one return instruction, until no more address pairs are found having a matching entry; and wherein step (d) is repeated for each match found in step (c).

\* \* \* \* \*